United States Patent
Jeon et al.

(10) Patent No.: US 10,796,398 B2
(45) Date of Patent: Oct. 6, 2020

(54) ELECTRONIC DEVICE FOR DISPLAYING IMAGE AND METHOD FOR CONTROLLING THE SAME

(71) Applicant: Samsung Electronics Co., Ltd., Suwon-si, Gyeonggi-do (KR)

(72) Inventors: Jin-Young Jeon, Suwon-si (KR); Jae-Joon Seo, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/169,506

(22) Filed: Oct. 24, 2018

(65) Prior Publication Data

US 2019/0122327 A1    Apr. 25, 2019

(30) Foreign Application Priority Data

Oct. 24, 2017 (KR) ........................ 10-2017-0138715

(51) Int. Cl.
*G09G 5/00* (2006.01)
*G06T 1/20* (2006.01)
(Continued)

(52) U.S. Cl.
CPC ................. *G06T 1/20* (2013.01); *G06F 3/14* (2013.01); *G09G 3/20* (2013.01); *G09G 5/001* (2013.01);
(Continued)

(58) Field of Classification Search
CPC .............. G09G 5/006; G09G 2310/08; G09G 2370/08; G09G 2360/127; G09G 5/12;
(Continued)

(56) References Cited

U.S. PATENT DOCUMENTS 5,543,824 A    8/1996  Priem et al.
5,727,192 A    3/1998  Baldwin
(Continued)

FOREIGN PATENT DOCUMENTS

JP    2012-037594 A    2/2012
KR    10-2018-0050174 A    5/2018

OTHER PUBLICATIONS

International Search Report with Written Opinion dated Feb. 21, 2019; International Appln. No. PCT/KR2018/012670.
(Continued)

*Primary Examiner* — Hau H Nguyen
(74) *Attorney, Agent, or Firm* — Jefferson IP Law, LLP

(57) ABSTRACT

An electronic device is provided. The electronic device includes a display, a display driver integrated circuit (DDI) including a clock generator and being operatively connected to the display, the DDI being configured to generate a hardware-based interrupt by using the clock generator, at least one processor operatively connected to the DDI, and a memory operatively connected to the at least one processor. The memory stores one or more instructions that, when executed, cause the at least one processor to receive a vertical synchronization (vsync) request associated with a frame displayed on the display, identify whether a software-based interrupt generated by an operation of the at least one processor is activated, and in response to determining that the software-based interrupt is not activated, prompt the DDI to activate the software-based interrupt without generating the hardware-based interrupt.

24 Claims, 11 Drawing Sheets

(51) Int. Cl.
    *G09G 5/36*     (2006.01)
    *G09G 3/20*     (2006.01)
    *G06F 3/14*     (2006.01)
    *G09G 5/18*     (2006.01)
    *G09G 5/393*     (2006.01)
    *H04N 21/426*     (2011.01)
    *H04N 21/43*     (2011.01)

(52) U.S. Cl.
    CPC ............... *G09G 5/006* (2013.01); *G09G 5/18* (2013.01); *G09G 5/363* (2013.01); *G09G 5/393* (2013.01); *G09G 2310/0267* (2013.01); *G09G 2330/021* (2013.01); *H04N 21/42653* (2013.01); *H04N 21/4302* (2013.01)

(58) Field of Classification Search
    CPC ............ G09G 5/18; G09G 2310/0267; G09G 2310/061; G06T 2200/28; G06F 1/3218; G06F 9/4411
    See application file for complete search history.

(56) References Cited

U.S. PATENT DOCUMENTS

| | | | |
|---|---|---|---|
| 5,737,536 | A | 4/1998 | Herrmann et al. |
| 5,903,261 | A | 5/1999 | Walsh et al. |
| 8,605,217 | B1 * | 12/2013 | Lafon ................ H04N 21/4305 348/497 |
| 2004/0239677 | A1 * | 12/2004 | Mutanen .................. G06F 3/14 345/545 |
| 2013/0201124 | A1 | 8/2013 | Choi et al. |
| 2014/0292785 | A1 | 10/2014 | Segal et al. |
| 2015/0325213 | A1 | 11/2015 | Lee et al. |
| 2017/0208219 | A1 | 7/2017 | Lee et al. |
| 2018/0130441 | A1 | 5/2018 | Jeon |

OTHER PUBLICATIONS

Extended European Search Report dated Apr. 9, 2020, issued in European Patent Application No. 18871555.1.

* cited by examiner

ELECTRONIC DEVICE FOR DISPLAYING IMAGE AND METHOD FOR CONTROLLING THE SAME

CROSS-REFERENCE TO RELATED APPLICATION(S)

This application is based on and claims priority under 35 U.S.C. § 119(a) of a Korean patent application number. 10-2017-0138715, filed on Oct. 24, 2017, in the Korean Intellectual Property Office, the disclosure of which is incorporated by reference herein in its entirety.

BACKGROUND

1. Field

The disclosure relates to an electronic device including a display and a method for controlling the electronic device. More particularly, the disclosure relates to an electronic device for displaying an image on a display at the request for an application and a method for controlling the electronic device.

2. Description of the Related Art

Recently, a technique has been disclosed in which a processor of an electronic device, such as a smartphone or a wearable device, executes at least one application (e.g., a Gallery application), generates an image in the executed application, and outputs the generated image through the display.

In such an image output technique, to smoothly display a plurality of images generated in the application through the display, modules related to image generation and output in the electronic device may generate and output the images according to a synchronization signal of a display driver integrated circuit (display driver IC or DDI).

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below.

The electronic device has to output a plurality of images by using a limited power source (e.g., a low-capacity battery). In this case, the electronic device uniformly activates a display driver integrated circuit (display driver IC or DDI) to generate a synchronization signal according to a request of an application without a separate determination. Since the electronic device uniformly applies power to the display driver IC without considering whether activation of the display driver IC is needed, unnecessary power consumption may occur.

In accordance with an aspect of the disclosure, an electronic device may activate a display driver integrated circuit through a hardware-based interrupt, and may perform an operation based on a virtual interrupt without activating the display driver integrated circuit by vertical synchronization. Accordingly, the display driver integrated circuit is not activated by the vertical synchronization, so that the power consumption can be reduced.

In accordance with an aspect of the disclosure, an electronic device is provided. The electronic device includes a display, a display driver IC (DDI) including a clock generator and being operatively connected to the display, the DDI being configured to generate a hardware-based interrupt by using the clock generator, at least one processor operatively connected to the DDI, and memory operatively connected to the at least one processor. The memory stores one or more instructions that, when executed, cause the at least one processor to receive a vertical synchronization (vsync) request associated with a frame displayed on the display, determine whether a software-based interrupt generated by an operation of the at least one processor is activated, and when determining that the software-based interrupt is not activated, prompt the DDI to activate the software-based interrupt without generating the hardware-based interrupt.

In accordance with an aspect of the disclosure, an electronic device is provided. The electronic includes a display, a display driver integrated circuit (DDI) including a clock generator and being operatively connected to the display, the DDI being configured to generate a hardware-based interrupt by using the clock generator, at least one processor operatively connected to the DDI, and memory operatively connected to the at least one processor. The memory stores one or more instructions that, when executed, cause the at least one processor to receive a frame update request associated with a frame displayed on the display, activate the DDI to generate the hardware-based interrupt, receive the hardware-based interrupt from the DDI, determine whether a software-based interrupt generated by an operation of the at least one processor is activated, and when determining that the software-based interrupt is not activated, prompt the DDI to activate the software-based interrupt while deactivating the DDI such that the DDI does not generate the hardware-based interrupt.

In accordance with another aspect of the disclosure, a method for controlling an electronic device is provided. The method includes receiving a vertical synchronization (vsync) request associated with a frame displayed on the display, determining whether a software-based interrupt is activated, and when determining that the software-based interrupt is not activated, activating the software-based interrupt without generating, by a display driver integrated circuit (DDI), a hardware-based interrupt.

In accordance with another aspect of the disclosure, a method for controlling an electronic device is provided. The method includes receiving a frame update request associated with a frame displayed on a display, activating a display driver integrated circuit (DDI) to generate a hardware-based interrupt, receiving the hardware-based interrupt from the DDI, determining whether a software-based interrupt generated by an operation of a processor of the electronic device is activated, and when determining that the software-based interrupt is not activated, prompting the DDI to activate the software-based interrupt while deactivating the DDI such that the DDI does not generate the hardware-based interrupt.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
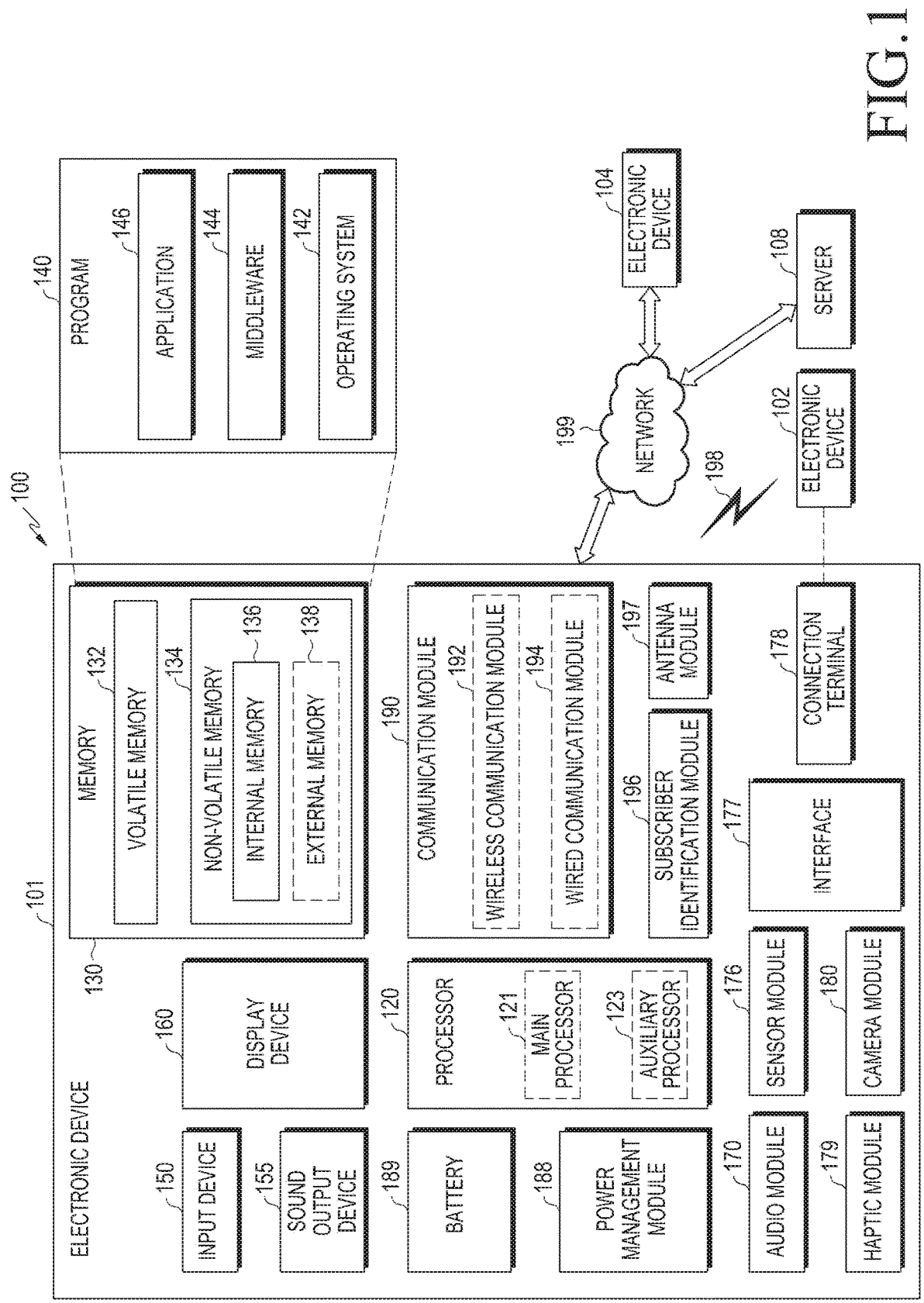
FIG. 1 illustrates a network environment including an electronic device according to various embodiments of the disclosure.

FIG. 1 is a block diagram illustrating an electronic device in a network environment according to various embodiments of the disclosure.

Referring to FIG. 1, an electronic device 101 in a network environment 100 may communicate with an external electronic device 102 via a first network 198 (e.g., a short-range wireless communication network), or an external electronic device 104 or a server 108 via a second network 199 (e.g., a long-range wireless communication network). According to an embodiment, the electronic device 101 may communicate with the external electronic device 104 via the server 108. According to an embodiment, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, and an antenna module 197. In some embodiments, at least one (e.g., the display device 160 or the camera module 180) of the components may be omitted from the electronic device 101, or other components may be added in the electronic device 101. In some embodiment, for example, like the sensor module 176 (e.g., a fingerprint sensor, an iris sensor, or an illumination sensor) embedded in the display device 160 (e.g., a display), some components may be integrated for implementation.

The processor 120 may execute, for example, software (e.g., a program 140) to control at least one other component (e.g., a hardware or software component) of the electronic device 101 coupled with the processor 120, and may perform various data processing and computation. The processor 120 may load a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from the main processor 121, additionally or alternatively uses lower power than the main processor 121, or is specialized for a designated function. The auxiliary processor 123 may be implemented as separate from, or as part of, the main processor 121.

In this case, the auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an ISP or a communication processor) may be implemented as part of another component (e.g., the camera module 180 or the communication module 190) functionally related to the auxiliary processor 123. The memory 130 stores various data used by at least one component (e.g., the processor 120 or the sensor module 176) of the electronic device 101, for example, software (e.g., the program 140) and input data or output data regarding a command associated therewith. The memory 130 may include the volatile memory 132 and the non-volatile memory 134.

The program 140 is a software stored in the memory 130, and may include, for example, an operating system (OS) 142, middleware 144, or an application 146.

The input device 150 is a device for receiving a command or data to be used by another component (e.g., the processor 120) of the electronic device 101, from the outside (e.g., a user) of the electronic device 101, and may include, for example, a microphone, a mouse, or a keyboard.

The output device 155 is a device for outputting an audio signal to the outside of the electronic device 101, and may include, for example, a speaker used for a general purpose such as multimedia playback or record playbacks and a receiver used for receiving a call. According to an embodiment, the receiver may be implemented as separate from, or as part of the speaker.

The display device 160 is a device for visually providing information to the user of the electronic device 101, and may include, for example, a display, a hologram device, or a projector and control circuitry to control a corresponding one of the display, hologram device, and projector. According to an embodiment, the display device 160 may include a touch circuitry or a pressure sensor capable of measuring the strength of a pressure with respect to a touch.

The audio module 170 bi-directionally converts sound and an electric signal. According to an embodiment, the audio module 170 may obtain the sound via the input device 150, or output the sound via the sound output device 155 or a headphone of an external electronic device (e.g., the external electronic device 102) wiredly or wirelessly coupled with the electronic device 101.

The sensor module 176 may detect an internal operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support a designated protocol for wiredly or wirelessly connection with the external electronic device (e.g., the external electronic device 102). According to an embodiment, the interface 177 may include a high definition multimedia interface (HDMI), a universal serial bus (USB) interface, a secure digital (SD) card interface, or an audio interface.

A connection terminal 178 may include a connector capable of physically connecting the electronic device 101 with an external electronic device (e.g., the external electronic device 102), for example, an HDMI connector, a USB connector, an SD connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 is a module for managing power supplied to the electronic device 101, and may be as at least a part of a power management integrated circuit (PMIC).

The battery 189 is a device for supplying power to at least one element of the electronic device 101, and may include, for example, a non-rechargeable primary battery, a rechargeable secondary battery, or a fuel cell.

The communication module 190 may support establishing a wired communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the AP) and supports a wired communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power-line communication module), and may communicate with the external electronic device via the first network 198 (e.g., a short-range communication network, such as Bluetooth™, Wi-Fi direct, or infrared data association (IrDA)) or the second network 199 (e.g., a long-range communication network, such as a cellular network, the Internet, or a computer network (e.g., an LAN or wide area network (WAN)). The above-described various types of the communication module 190 may be implemented with a single chip or separate chips.

According to an embodiment, the wireless communication module 192 identifies and authenticates the electronic device 101 in a communication network by using user information stored in the SIM 196.

The antenna module 197 may include one or more antennas for transmitting or receiving a signal or power to or from the outside. According to an embodiment, the communication module 190 (e.g., the wireless communication module 192) may transmit or receive a signal to or from an external electronic device via an antenna suitable for a communication scheme.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic device 102 and the external electronic device 104 may be a device of the same type as or a different type than the electronic device 101. According to an embodiment, some or all of operations performed by the electronic device 101 may be performed in another electronic device or a plurality of other electronic devices. According to an embodiment, when the electronic device 101 has to perform a function or a service automatically or at a request, the electronic device 101 may request an external electronic device to perform at least some functions associated with the function or the service, instead of or in addition to executing the function or the service. The external electronic device having received the request may execute the requested function or additional function and deliver the execution result to the electronic device 101. The electronic device 101 may then process or further process the received result to provide the requested function or service. To this end, for example, cloud computing, distributed computing, or client-server computing may be used.

Figure 2:
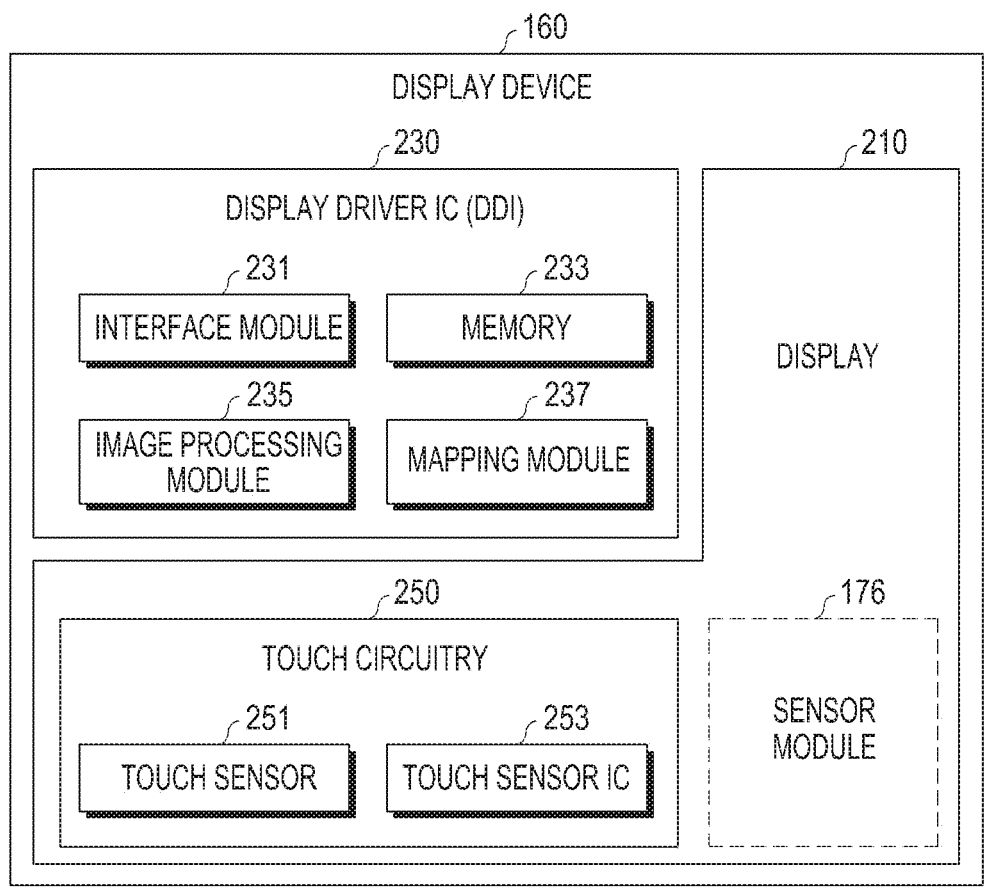
FIG. 2 is a block diagram of a display device according to various embodiments of the disclosure.

FIG. 2 is a block diagram of a display device according to various embodiments of the disclosure.

Referring to FIG. 2, the display device 160 may include a display 210 and a display driver integrated circuit (display driver IC or DDI) 230 to control the display 210. The DDI 230 may include an interface module 231, a memory 233 (e.g., buffer memory), an image processing module 235, or a mapping module 237. The DDI 230 receives image data or image information including an image control signal corresponding to a command for controlling the image data from the processor 120 (e.g., the main processor 121 (e.g., an application processor) or the auxiliary processor 123 managed independently of a function of the main processor 121) via the interface module 231. The DDI 230 may communicate, for example, with touch circuitry 250 or the sensor module 176 via the interface module 231. The DDI 230 may also store at least part of the received image information in the memory 233, for example, on a frame by frame basis. The image processing module 235 may perform pre-processing or post-processing (e.g., adjustment of resolution, brightness, or size) with respect to at least part of the image data. According to an embodiment, the pre-processing or post-processing may be performed, for example, based at least in part on one or more characteristics of the image data or one or more characteristics of the display 210. The mapping module 237 converts the image data pre-processed or post-processed by the image processing module 135 into a voltage value or a current value used to drive pixels of the display 210 at least partially based on attributes of the pixels (e.g., an arrangement of the pixels (a red/green/blue (RGB) stripe or pentile) or a size of each of sub-pixels). At least some pixels of the display 210 may be driven, for example, based at least in part on the voltage value or the current value such that visual information (e.g., a text, an image, or an icon) corresponding to the image data may be displayed via the display 210.

According to an embodiment, the display device 160 may further include the touch circuitry 250. The touch circuitry 250 may include a touch sensor 251 and a touch sensor IC 253 to control the touch sensor 251. The touch sensor IC 253 controls the touch sensor 251 to sense a touch input or a hovering input with respect to a particular position on the display 210 by measuring a change in a signal (e.g., a voltage, a radiation intensity, a resistance, or an electric charge quantity) with respect to the particular position, and provides information about the sensed touch input or hovering input (e.g., a position, an area, a pressure, or a time) to the processor 120. According to an embodiment, at least part (e.g., the touch sensor IC 253) of the touch circuitry 250 may be formed as part of the display 210 or the DDI 230, or as part of another component (e.g., the auxiliary processor 123) disposed outside the display device 160.

According to an embodiment, the display device 160 may further include at least one sensor (e.g., a fingerprint sensor, an iris sensor, a pressure sensor, or an illuminance sensor) of the sensor module 176 or a control circuit for the at least one sensor. In such a case, the at least one sensor or the control circuit for the at least one sensor may be embedded in one portion of the display device 160 (e.g., the display 210 or the DDI 230) or one portion of the touch circuitry 250. For example, when the sensor module 176 embedded in the display device 160 includes a biometric sensor (e.g., a fingerprint sensor), the biometric sensor may obtain biometric information (e.g., a fingerprint image) corresponding to a touch input received via a portion of the display 210. As another example, when the sensor module 176 embedded in the display device 160 includes a pressure sensor, the pressure sensor may obtain pressure information corresponding to a touch input received via a partial or whole area of the display 210. According to an embodiment, the touch sensor 251 or the sensor module 176 may be disposed between pixels in a pixel layer of the display 210, or over or under the pixel layer.

Figure 3:
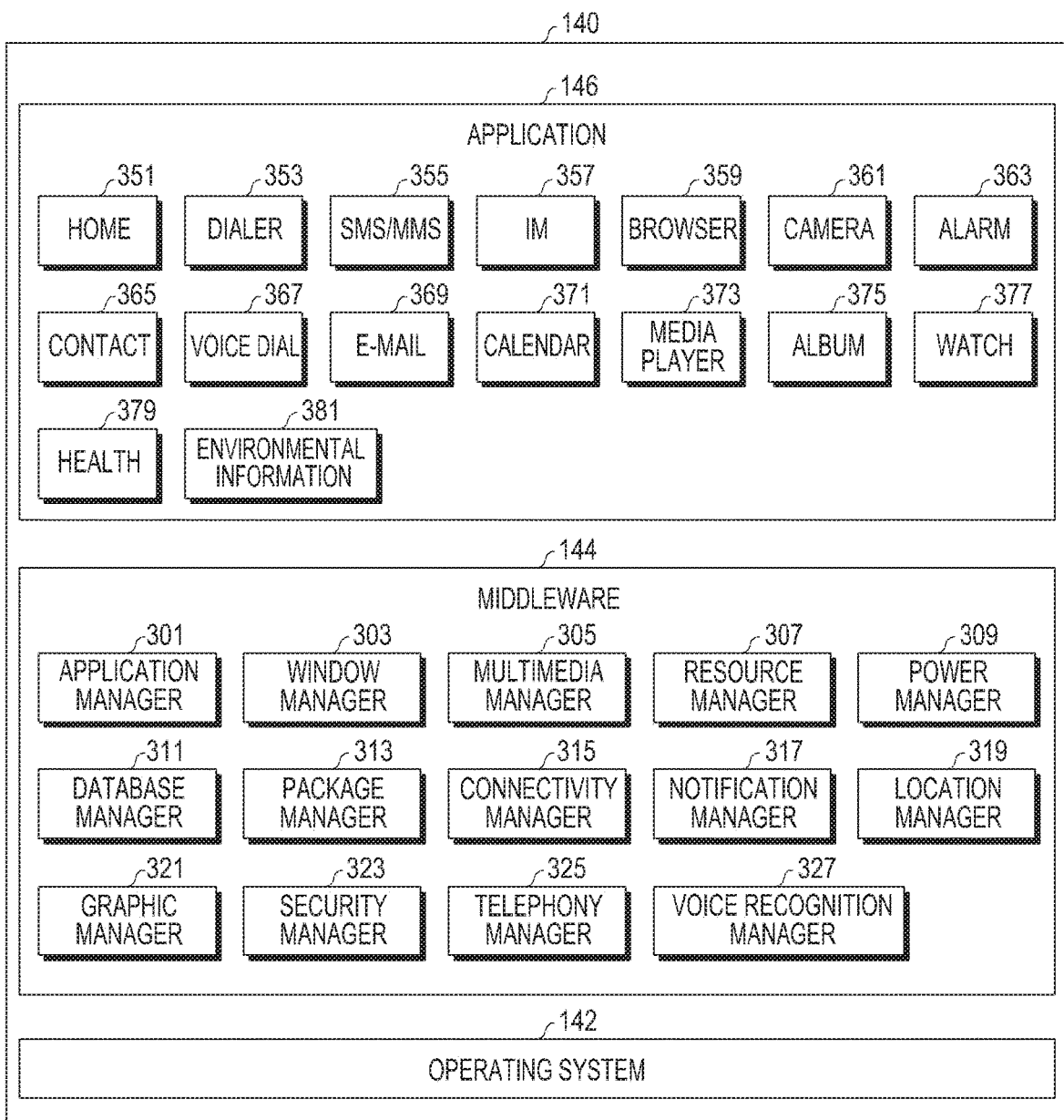
FIG. 3 is a block diagram of a program according to various embodiments of the disclosure.

FIG. 3 is a block diagram of a program according to various embodiments of the disclosure.

Referring to FIG. 3, according to an embodiment, a program (e.g., the program 140 of FIG. 1) may include an OS 142 to control one or more resources of the electronic device 101, middleware 144, or the application 146 executable in the OS 142. The OS may include Android™, iOS™, Windows, Symbian™, Tizen™, or Bada™. At least part of the program 140, for example, may be pre-loaded on the electronic device 101 during manufacture, or may be downloaded from or updated by an external electronic device (e.g., the external electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input device 150, the sound output device 155, the display device 160, the audio module 170, the sensor module 176, the interface 177, the haptic module 179, the camera module 180, the power management module 188, the battery 189, the communication module 190, the SIM 196, or the antenna module 197.

The middleware 144 may provide various functions to the application 146 such that a function or information provided from one or more resources of the electronic device 101 may be used by the application 146. The middleware 144 may include, for example, an application manager 301, a window manager 303, a multimedia manager 305, a resource manager 307, a power manager 309, a database manager 311, a package manager 313, a connectivity manager 315, a notification manager 317, a location manager 319, a graphic manager 321, a security manager 323, a telephony manager 325, or a voice recognition manager 327. The application manager 301 manages a life cycle of the applications 146. The window manager 303 manages, for example, a GUI resource used in a screen. The multimedia manager 305 recognizes a format necessary for playing various media files and performs encoding or decoding with respect to a media file by using a codec appropriate to a corresponding format. The resource manager 307 manages, for example, a source code or a memory space of the application 146. The power manager 309 manages a capacity, a temperature, or power of a battery and determines or provides power information necessary for an operation of the electronic device 101 using corresponding information. According to an embodiment, the power manager 309 may operate with basic input/output system (BIOS).

The database manager 311 generates, searches or changes a database used for the application 146. The package manager 313 manages the installation or update of an application distributed in a package file format. The connectivity manager 315, for example, may manage a wireless connection or a direct connection between the electronic device 101 and an external electronic device. The notification manager 317, for example, may provide a function to notify a user of an occurring event (e.g., an incoming call, message, or alert). The location manager 319 manages location information of the electronic device 101. The graphic manager 321 manages a graphic effect to be provided to a user or a user interface relating thereto. The security manager 323 provides system security or user authentication. The telephony manager 325, for example, may manage a voice call function or a video call function provided by the electronic device 101. The voice recognition manager 327, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 344 may dynamically delete some existing components or add new components. According to an embodiment, at least part of the middleware 144 may be included as part of the OS 142 or may be implemented as another software separate from the OS 142.

The application 146 may include one or more applications capable of providing a function, for example, a home application 351, a dialer application 353, a short messaging service/multimedia messaging service (SMS/MMS) application 355, an instant message (IM) application 357, a browser application 359, a camera application 361, an alarm application 363, a contact application 365, a voice dial application 367, an e-mail application 369, a calendar application 371, a media player application 373, an album application 375, a watch application 377, a health application 379 (e.g., an application for measuring an exercise amount, a blood sugar, etc.), or an environment information application 381 (e.g., an application for providing air pressure, humidity, or temperature information or the like). According to an embodiment, the application 146 may further include an information exchanging application (not shown) that is capable of supporting information exchange between the electronic device 101 and the external electronic device. The information exchange application may include, for example, a notification relay application for transferring specific information (e.g., a call, a message, or an alarm) to the external electronic device or a device management application for managing the external electronic device. The notification relay application delivers notification information corresponding to an event (e.g., e-mail reception) occurring on another application of the electronic device 101 (e.g., the e-mail application 369) to an external electronic device, or receives notification information from an external electronic device and provides the received notification information to the user of the electronic device 101. The device management application may control the power (e.g., turn-on or turn-off) or the function (e.g., adjustment of brightness, resolution, or focus) of the external electronic device communicating with the electronic device 101 or some component thereof (e.g., the display device 160 or the camera module 180). The device management application, additionally or alternatively, may support installation, delete, or update of an application running on the external electronic device.

Figure 4:
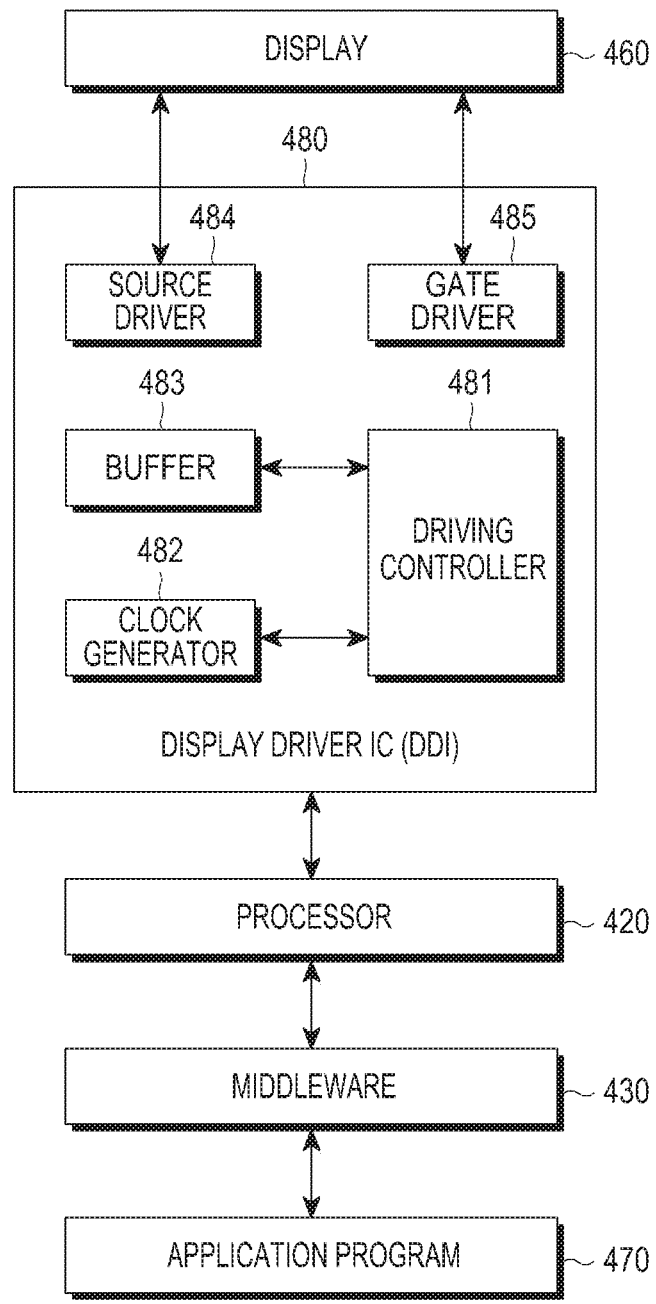
FIG. 4 is a block diagram of an electronic device according to various embodiments of the disclosure.

FIG. 4 is a block diagram of an electronic device according to various embodiments of the disclosure.

Referring to FIG. 4, according to various embodiments of the disclosure, the electronic device may include a display 460 (e.g., the display device 160 of FIG. 1), a DDI 480 (e.g., the DDI 230 of FIG. 2), and/or a processor 420 (e.g., the processor 120 of FIG. 1). According to various embodiments, the electronic device 101 may execute an application program 470 (e.g., the application 146 of FIG. 1). The application program 470 transmits and receives data with hardware in a hardware layer (e.g., the processor 420, the display 460, and/or the DDI 480) through middleware 430 (e.g., the middleware 144 of FIG. 1).

According to various embodiments, the display 460 may include a panel.

According to various embodiments, the processor 420 controls the application program 470 and at least one program (e.g., a manager) stored in the middleware 430. For example, the processor 420 may initiate at least one process executed on at least one application program stored in the application program 470 or execute at least one process. The operation of initiating a particular process may mean that the processor 420 initiates a particular process of at least one application program. The process initiating operation may mean that the processor 420 collects data (e.g., a synchronization signal) for executing a particular process of at least one application program from the application program 470 before executing the particular process. For example, the processor 420 may receive a vertical synchronization (vsync) request or a frame update request from the at least one application program 470 to execute the particular process.

According to various embodiments, before executing the at least one process, the processor 420 may determine whether the at least one process is based on the vsync request or the frame update request. The vsync request is used to request a synchronization signal, and in response thereto, a synchronization signal generated by the DDI or the processor may be returned. The frame update request may be a frame requesting that the processor update an already-displayed frame and display another frame on the display 460.

According to various embodiments of the disclosure, when the at least one process is based on the frame update request, the processor 420 sends a request to the DDI 480 for a synchronization signal for executing the at least one process. For example, the synchronization signal may be a hardware-based interrupt generated by the hardware configuration of the DDI 480 and delivered to the processor. According to various embodiments, the processor 420 receives a frame update request through a graphics manager (e.g., the graphic manager 321) stored in the middleware 430 from the application 470. For example, the processor 420 may execute a Gallery application stored in the application program 470 and receive a frame update request for changing a frame displayed on the display from the executed Gallery application. Upon receiving the frame update request, the processor 420 sends the frame update request to the DDI 480 and receives a hardware-based interrupt from the DDI 480.

According to various embodiments of the disclosure, when the at least one process is based on the vsync request, the processor 420 generates a virtual interrupt and delivers the generated virtual interrupt to the application program 470 through the middleware 430 without sending a request for a synchronization signal to the DDI 480. The virtual interrupt may be an interrupt the processor 420 generates based on software without activating the DDI 480. According to an embodiment, the processor 420, having received the vsync request through a graphics manager (e.g., the graphic manager 321) of the middleware 430 from the application program 470, generates a software-based virtual interrupt without sending the vsync request to the DDI 480. The processor 420 transmits the virtual interrupt to the application program 470 through the middleware 430. In this way, when the vsync request is delivered to the processor 420, the processor 420 does not turn on the DDI 480, thus reducing power consumption.

According to various embodiments, the DDI 480 may include a driving controller 481, a clock generator 482, a buffer 483, a source driver 484, and/or a gate driver 485.

According to various embodiments, the driving controller 481 controls the operations of the driving controller 481, the clock generator 482, the buffer 483, the source driver 484, and/or the gate driver 485. For example, the driving controller 481 may receive an image from the processor 420 and store the received image in the buffer 483. In another example, the driving controller 481 may output an image stored in the buffer 483 through the display 460. In another example, the driving controller 481 may output an image on the display 460 by using the source driver 484.

According to various embodiments, when the process of the processor 420 corresponding to the frame update request is a process for outputting an image, the driving controller 481, in response to the frame update request received from the processor 420, transmits a hardware-based interrupt to the processor 420. A display synchronization signal may be transmitted as below.

For example, the driving controller 481 may maintain the gate driver 485 in an active state. According to various embodiments, the driving controller 481 applies a preset test signal to the display 460 by using the gate driver 485. For example, the driving controller 481 may receive a synchronization signal in response to a test signal applied through the gate driver 485 and obtain a preset refresh cycle of the display 460 based on the received synchronization signal. The driving controller 481 generates the hardware-based interrupt based on the refresh cycle of the synchronization signal and transmits the generated hardware-based interrupt to the processor 420. The processor 420 delivers the hardware-based interrupt to an application requesting the synchronization signal.

According to various embodiments, in response to the synchronization signal request received from the processor 420, the driving controller 481, according to a frame update request of the processor 420 corresponding to the synchronization signal request, transmits the hardware-based interrupt to the processor 420. For example, the driving controller 481 generates a clock synchronization signal corresponding to a preset period by using the clock generator 482. For example, the driving controller 481 may generate a clock synchronization signal by using a periodic signal (e.g., a clock signal) having a preset period generated in the clock generator 482. The driving controller 481 may generate a second periodic signal having the same period as that of the first periodic signal generated in the clock generator 482 or having a period that is an integer multiple of that of the first periodic signal, and may generate a hardware-based interrupt having the same period as that of a refresh cycle of a display (e.g., the display device 160) by using the generated second periodic signal. The driving controller 481 transmits the generated hardware-based interrupt to the processor 420.

Figure 5A:
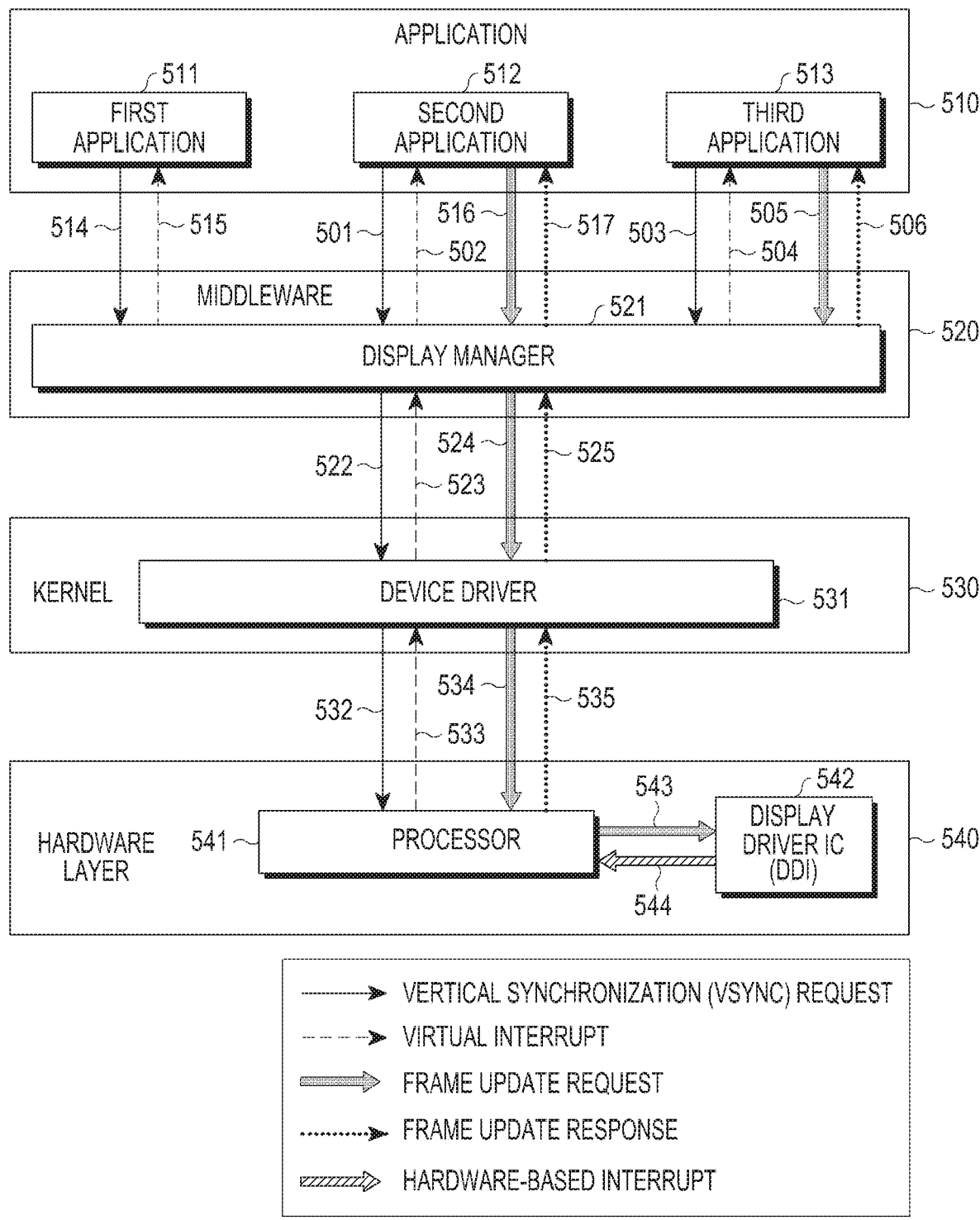
FIG. 5A is a block diagram of an electronic device according to various embodiments of the disclosure.

FIG. 5A is a block diagram of an electronic device according to various embodiments of the disclosure.

Figure 5B:
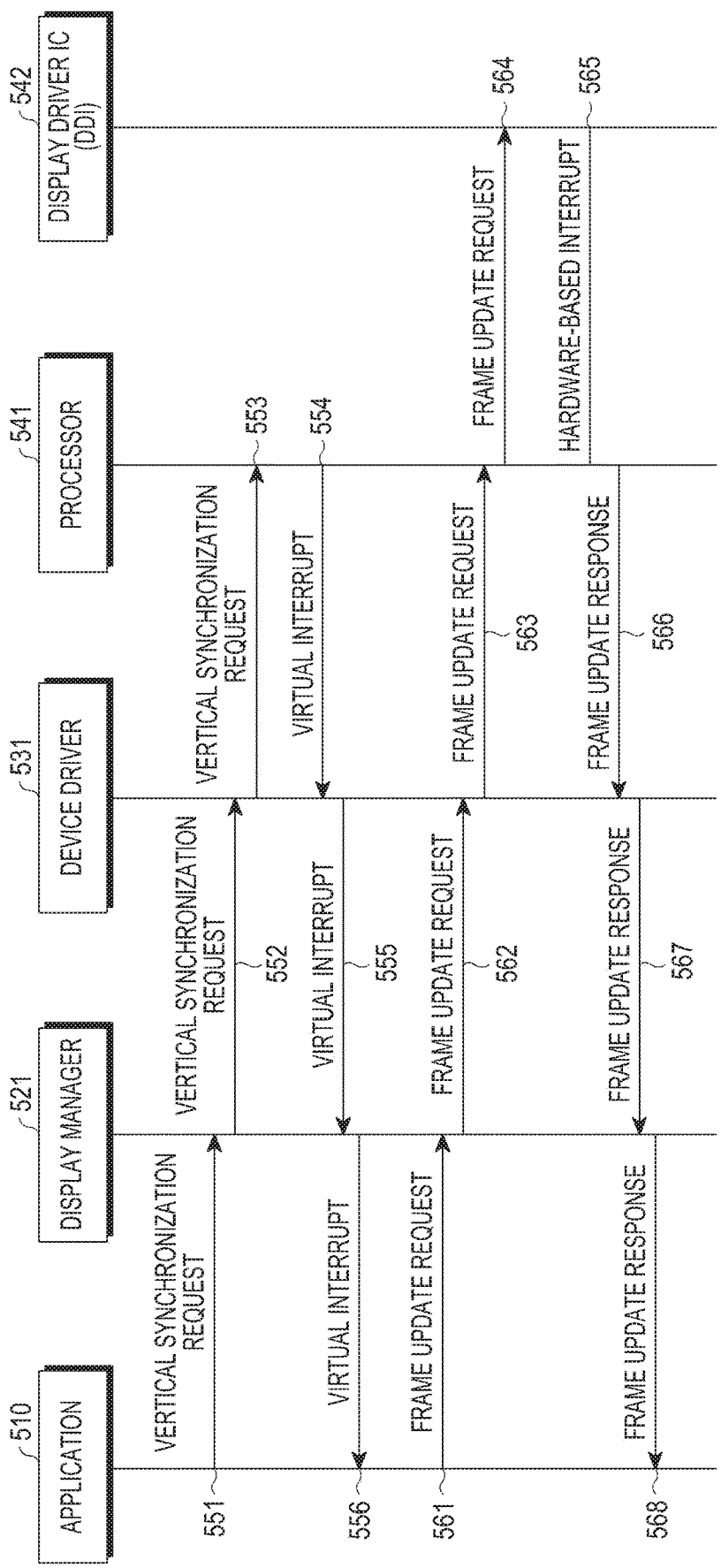
FIG. 5B is a flowchart illustrating a method for controlling an electronic device according to various embodiments of the disclosure.

FIG. 5B is a flowchart illustrating a method for controlling an electronic device according to various embodiments of the disclosure.

Referring to FIGS. 5A and 5B, a programming module of the electronic device 101, according to various embodiments of the disclosure, may include an application 510 (e.g., the application 146 of FIG. 1), middleware 520 (e.g., the middleware 144 of FIG. 3), a kernel 530 (e.g., the OS 142 of FIG. 1), and a hardware layer 540. The hardware layer 540 may include a processor 541 (e.g., the processor 120 of FIG. 1) and a DDI 542 (e.g., the DDI 230 of FIG. 1).

In the electronic device 101, according to various embodiments, the application 510 may be connected with the middleware 520 and may include a first application 511, a second application 512, and a third application 513. At least one of the first application 511, the second application 512, and the third application 513 included in the application 510 may send a vsync request to a display manager 521 of the middleware 520, in operation 551 in FIG. 5B. For example, the first application 511 may send a vsync request 514 to the display manager 521 of the middleware 520. The second application 512 may send a vsync request 501 to the display manager 521 of the middleware 520. The third application 513 may send a vsync request 503 to the display manager 521 of the middleware 520. Upon receiving the vsync request 514, 501, or 503 from at least one of the first application 511, the second application 512, and the third application 513, the display manager 521 sends a vsync request 522 to a device driver 531 of the kernel 530 (e.g., the OS 142 of FIG. 3). For example, upon receiving the vsync request 514 from the first application 511, the display manager 521 may send the vsync request 522 to the device driver 531 of the kernel 530, in operation 552 in FIG. 5B. The device driver 531 sends a vsync request 532 to the processor 541 (e.g., the processor 120 of FIG. 1) of the electronic device (e.g., the electronic device 101 of FIG. 1), in operation 553 in FIG. 5B.

According to various embodiments of the disclosure, upon receiving the vsync request 532 from the device driver 531, the processor 541 activates a virtual interrupt 533 and transmits the virtual interrupt 533 to the device driver 531, without activating the DDI 542, thus providing a vsync event, in operation 554 in FIG. 5B. The device driver 531, having received the vsync event, sends a software-based interrupt (e.g., a virtual interrupt 523) to the display manager 521, in operation 555 in FIG. 5B. The display manager 521 transmits at least one of a virtual interrupt 515 to the first application 511, a virtual interrupt 502 to the second application 512, and a virtual interrupt 504 to the third application 513, in operation 556 in FIG. 5B. The first application 511 may operate, for example, in the background, but may request and receive a synchronization signal and may generate an image by using the synchronization signal.

According to various embodiments of the disclosure, the display manager 521 receives a frame update request 516 from the second application 512. Upon receiving the frame update request 516 from the second application 512, the display manager 521 may send a frame update request 524 to the device driver 531 of the kernel 530. The processor 541 receives a frame update request 534 from the device driver 531. The frame update request may be a request for activating the DDI 542 to display a frame on a display (e.g., the display device 160). For example, the frame update request may be a screen update request. The second application 512 may be an application operating, for example, in the foreground. The frame may be a single frame or may be a plurality of frames. The second application 512 transmits the frame update request 516 for requesting the DDI to display the frame on the display to the display manager 521, in operation 561 in FIG. 5B. When receiving the frame update request 516, the display manager 521 may send the frame update request 516 to the device driver 531, in operation 562 in FIG. 5B. The processor 541 may receive the frame update request 516 from the device driver 531, in operation 563 in FIG. 5B. When receiving the frame update request 516 from the device driver 531, the processor 541 transmits the frame update request 516 to the DDI 542 to activate the DDI 542 to display the frame on the display, in operation 564 in FIG. 5B.

According to various embodiments of the disclosure, when receiving the frame update request 516 from the processor 541, the DDI 542 may be activated in order to display the frame on the display. When the frame is displayed on the display, the DDI 542 activates a hardware-based interrupt 544 and transmits the hardware-based interrupt 544 to the processor 541, in operation 565 in FIG. 5B. The DDI 542 generates the hardware-based interrupt 544 by using a clock. As described above, a driving controller (not shown, e.g., the driving controller 481 of FIG. 4) of the DDI 542 generates a clock synchronization signal by using a periodic signal having a preset period (e.g., a clock signal, hardware (HW) interrupt) generated in a clock generator (e.g., the clock generator 482 of FIG. 4) when a gate driver (not shown, e.g., the gate driver 485 of FIG. 4) is in an inactive state. For example, the driving controller 481 may generate a second periodic signal having a period that is an integer multiple of that of the first periodic signal, and, by using the generated second periodic signal, may generate a hardware-based interrupt having the same period as that of a refresh cycle of a display (e.g., the display device 160).

The DDI 542, according to various embodiments of the disclosure, obtains operation period information of the display (e.g., the display device 160) by using the gate driver 485, generates a hardware-based interrupt based on the operation period information of the display, and transmits the generated hardware-based interrupt 544 to the processor (e.g., the processor 120 of FIG. 1). According to various embodiments, the DDI may activate the gate driver 485 to display a frame corresponding to a frame update request to the display.

According to various embodiments of the disclosure, when receiving the hardware-based interrupt 544 from the DDI 542, the processor 541 transmits a frame update response 535 to the device driver 531, in operation 566 in FIG. 5B. The device driver 531 sends a frame update response 525 to the display manager 521, in operation 567 in FIG. 5B. Upon receiving the frame update response 525 from the device driver 531, the display manager 521 may send a frame update response 517 to the second application 512 (i.e., application 510), in operation 568 in FIG. 5B.

According to various embodiments of the disclosure, the electronic device receives a frame update request from a plurality of applications and performs an operation updating a plurality of frames on one display. The display manager 521 receives the frame update request 516 from the second application 512 and receives a frame update request 505 from the third application 513 and later responds by sending the frame update response 517 to the second application and a frame update response 506 to the third application 513. The display manager 521 may send the frame update request 524 to the device driver 531 which may then activate the frame update request 534 in the processor 541. The processor 541 may transmit a frame update request 543 to activate the DDI 542 which may then perform frame update for each of a plurality of frame update requests to update a screen.

Figure 6:
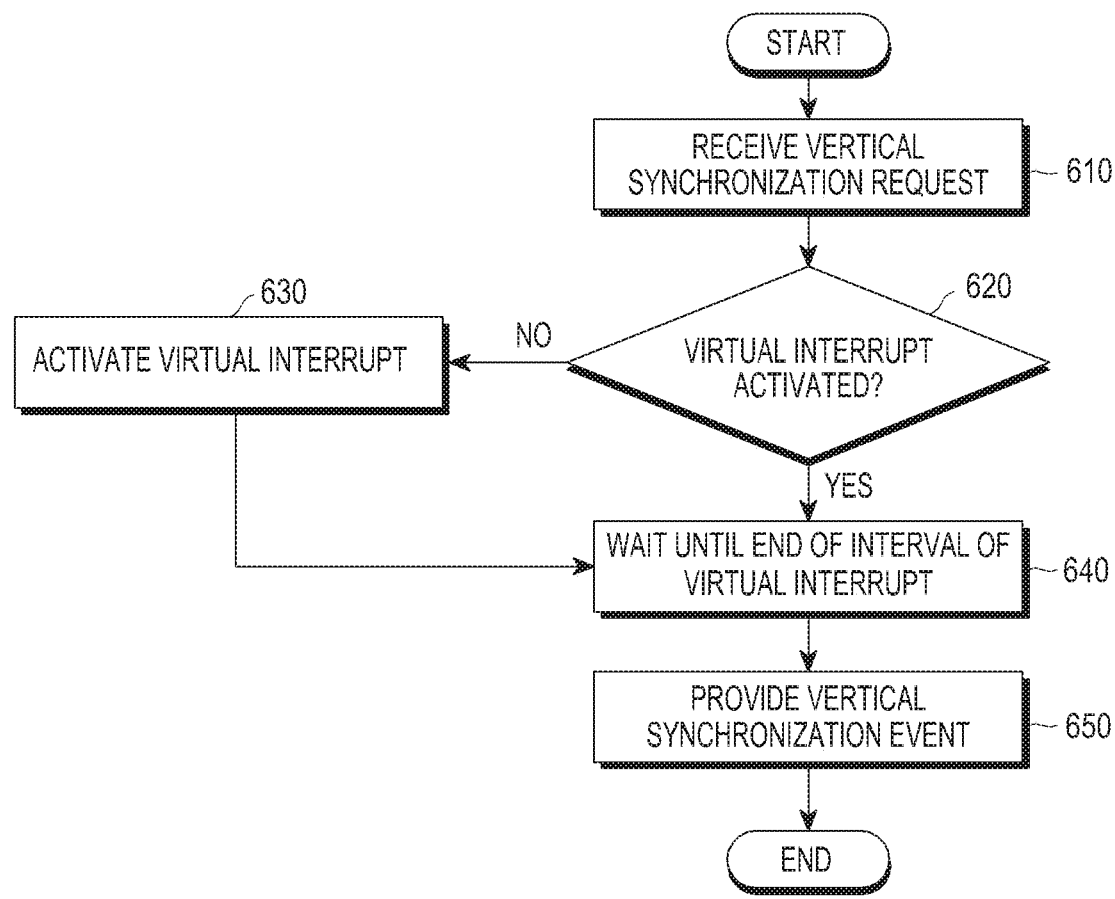
FIG. 6 is a flowchart illustrating a method for controlling an electronic device according to various embodiments of the disclosure.

FIG. 6 is a flowchart illustrating a method for controlling an electronic device according to various embodiments of the disclosure.

Referring to FIG. 6, in operation 610, the processor (e.g., the processor 120 of FIG. 1 or the processor 541 of FIG. 5A) receives a vsync request displayed on the display (e.g., the display device 160 of FIG. 1). For example, as described above with reference to FIGS. 5A and 5B, the processor receives the vsync request generated in at least one of applications (e.g., the application 510 of FIG. 5A) from the device driver (e.g., the device driver 531 of FIG. 5A).

In operation 620, the processor determines whether a virtual interrupt is activated. In operation 630, when the virtual interrupt is not activated, the processor activates the virtual interrupt. If the virtual interrupt is already activated in operation 620 or the processor activates the virtual interrupt in operation 630, the processor waits until the end of an interval of the virtual interrupt, in operation 640. The virtual interrupt is repeated within a specific period, and may wait until the end of one interval. The processor may activate only the virtual interrupt without transmitting the vsync request for activating the DDI to the DDI.

In operation 650, the processor provides a vsync event. If the virtual interrupt is activated through operation 620 or operation 630, the processor transmits the virtual interrupt to the device driver to provide a vsync event. The processor transmits the virtual interrupt to the application (e.g., the application 510 of FIG. 5A) through the device driver (e.g., the device driver 531 of FIG. 5A) and the display manager (e.g., the display manager 521 of FIG. 5A), thereby providing the vsync event to the application, as described above with reference to FIGS. 5A and 5B.

Figure 7A:
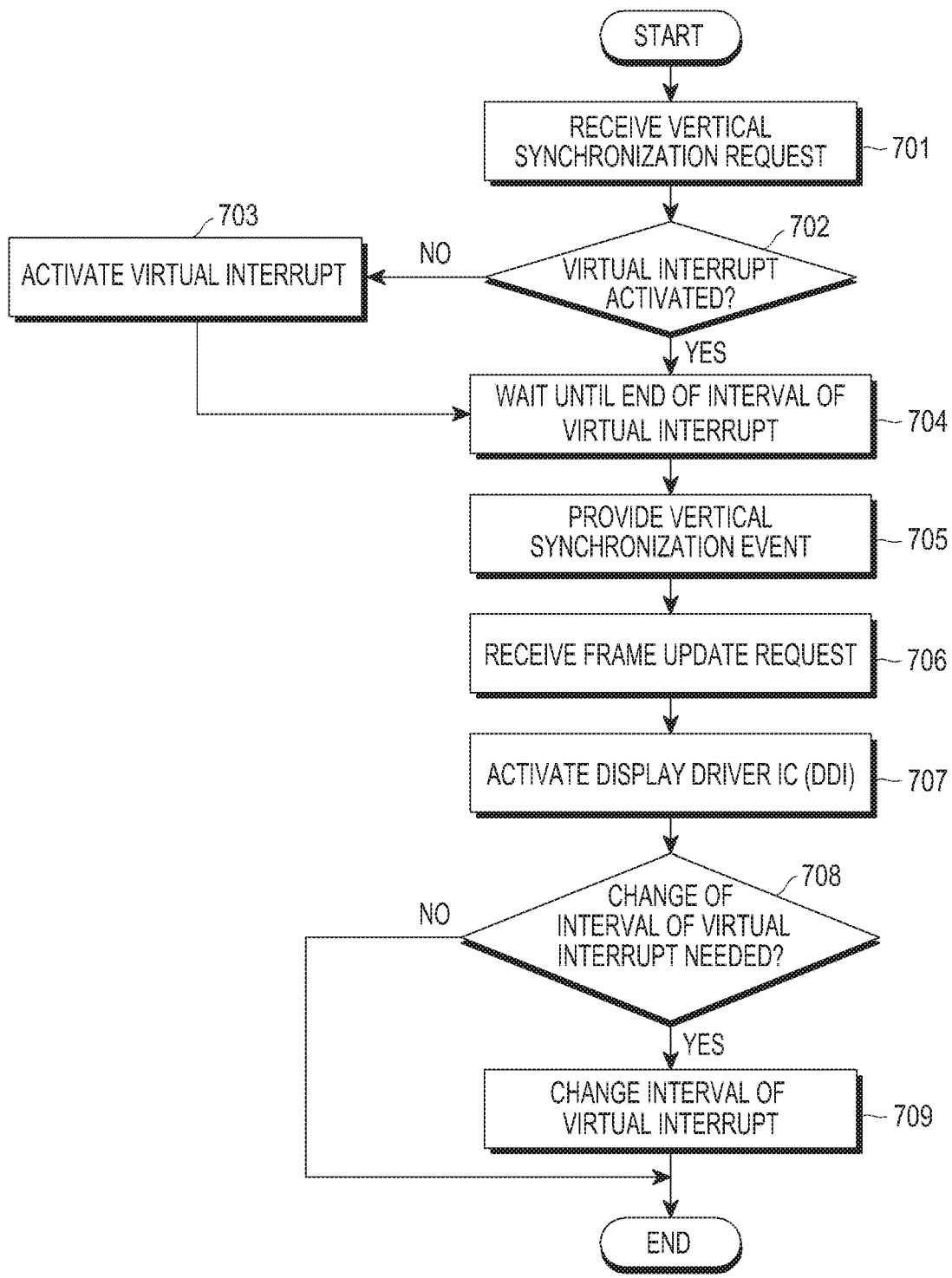
FIG. 7A is a flowchart illustrating a method for controlling an electronic device according to various embodiments of the disclosure.

FIG. 7A is a flowchart illustrating a method for controlling an electronic device according to various embodiments of the disclosure. FIG. 7C is a diagram of a configuration where an electronic device synchronizes an interval of a virtual interrupt to an interval of a frame update according to various embodiments of the disclosure.

Referring to FIGS. 7A and 7C, in operation 701, the processor (e.g., the processor 120 of FIG. 1) receives a vsync request.

The processor (e.g., the processor 120 of FIG. 1), according to various embodiments of the disclosure, receives the vsync request from the device driver 531. For example, as shown in FIGS. 5A and 5B, the processor 541 may receive the vsync request generated in at least one application (e.g., the application 510 of FIG. 5A) from the at least one application through the display manager 521 and the device driver 531.

In operation 702, the processor determines whether a virtual interrupt is activated. To transmit the virtual interrupt to the application, the processor determines whether the virtual interrupt is activated. In operation 703, when the virtual interrupt is not activated, the processor activates the virtual interrupt. For example, when the virtual interrupt is not activated, the processor may activate a virtual interrupt having a particular interval. The virtual interrupt may be a software-based interrupt generated by the processor. For example, the interval for the virtual interrupt may be the same as the interval for the hardware-based interrupt. According to an embodiment, the interval for the virtual interrupt and the interval for the hardware-based interrupt are the same but may not be synchronized with each other. Referring to FIG. 7C, a first virtual interrupt 720, having a designated interval, may be activated in advance or may be activated by the processor 120. For example, the first virtual interrupt 720 may have an interval of 20 ms as shown in FIG. 7C, but this illustration is merely an example, and various embodiments of the disclosure are not limited thereto.

In operation 704, the processor waits until the end of the interval for the virtual interrupt. For example, referring to FIG. 7C, the first virtual interrupt 720 occurs repeatedly at every interval of 0 ms to 20 ms, and the processor waits until the end of the interval at every interval of 20 ms after activation of the first virtual interrupt 720.

In operation 705, the processor provides a vsync event.

For example, if the virtual interrupt is activated, the processor may provide a vsync event based on the virtual interrupt to a device driver (e.g., the device driver 531 of FIG. 5A). The processor may transmit the virtual interrupt to an application through a device driver and a display manager as described with reference to FIGS. 5A and 5B. The processor provides the vsync event to the application by transmitting the virtual interrupt to the device driver. Operations 701 to 705 may be performed repeatedly by the processor.

In operation 706, the processor receives a frame update request. In operation 707, the processor activates the DDI 542. The processor may receive the frame update request generated in the application through the display manager 521 and the device driver 531 and activate the DDI 542. Referring to FIG. 7C, the processor 120 receives the frame update request at a point 730 of 40 ms, and the DDI 542 is activated at a point 731 at which the time required for activating the DDI 542 and displaying a frame on the display has elapsed from 40 ms.

In operation 708, the processor 120 determines whether a change of the interval of the virtual interrupt is needed. Once the DDI 542 is activated, the DDI 542 activates a hardware-based interrupt 750 and transmits the hardware-based interrupt 750 to the processor 120. For example, referring to FIG. 7C, the DDI 542 generates the hardware-based interrupt 750 at a point 740 of 50 ms and transmits the hardware-based interrupt 750 to the processor 120. The hardware-based interrupt 750 after 50 ms may have the same interval (e.g., 20 ms) as the first virtual interrupt 720, but the start point thereof is 50 ms and the start point of the first virtual interrupt 720 is 0 ms. The difference therebetween is not an integer multiple of the interval 20 ms and thus the virtual interrupt and the hardware-based interrupt may not have been synchronized with each other.

According to various embodiments of the disclosure, the hardware-based interrupt is activated such that the DDI 542 transmits the hardware-based interrupt to the processor 120. The processor checks the interval of the hardware-based interrupt and the interval of the virtual interrupt (e.g., the software-based interrupt) to determine whether to change the interval of the virtual interrupt. For example, referring to FIG. 7C, in a normal case where the hardware-based interrupt does not occur, the next interrupt of the first virtual interrupt 720 may occur at 60 ms. The processor determines whether to change the interval of the first virtual interrupt 720 to synchronize it with the hardware-based interrupt 750 if the hardware-based interrupt occurs at 50 ms.

In operation 709, the processor changes the interval of the virtual interrupt. According to various embodiments of the disclosure, if determining not to change the interval of the virtual interrupt, the processor deactivates the DDI. If determining to change the interval of the virtual interrupt, the processor synchronizes a point to activate a next interval of the first virtual interrupt 720 with the interval of the hardware-based interrupt 750 to set to 70 ms. For example, the processor may determine that delta data between the hardware-based interrupt 750 and the first virtual interrupt 720 is 10 ms. By adding the determined delta data to a next interval, the processor may generate a second virtual interrupt 760 at 70 ms, that is, 30 ms (20 ms+10 ms) after the virtual interrupt that occurred at 40 ms, and may generate the virtual interrupt with the previous interval of 20 ms after 70 ms. The second virtual interrupt 760 and the hardware-based interrupt 750 may be synchronized with each other in terms of an activation point (e.g., 70 ms) and an interval (20 ms).

Figure 7B:
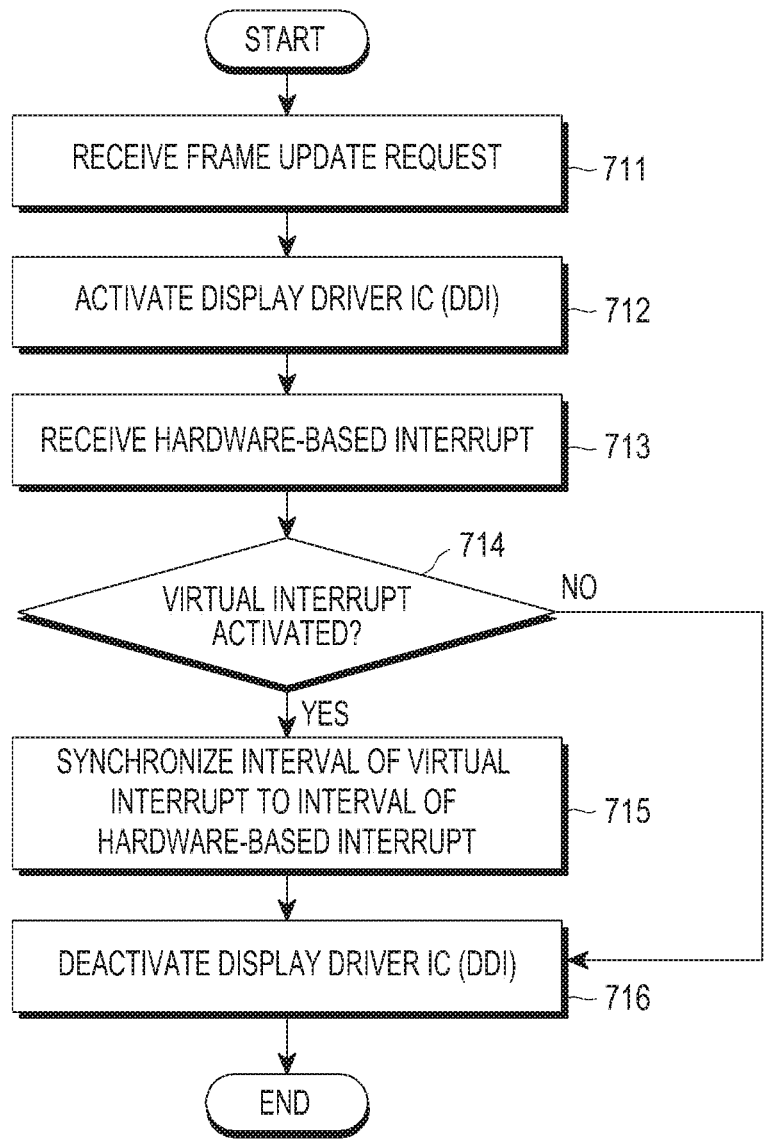
FIG. 7B is a flowchart illustrating a method for controlling an electronic device according to various embodiments of the disclosure.
Figure 7C:
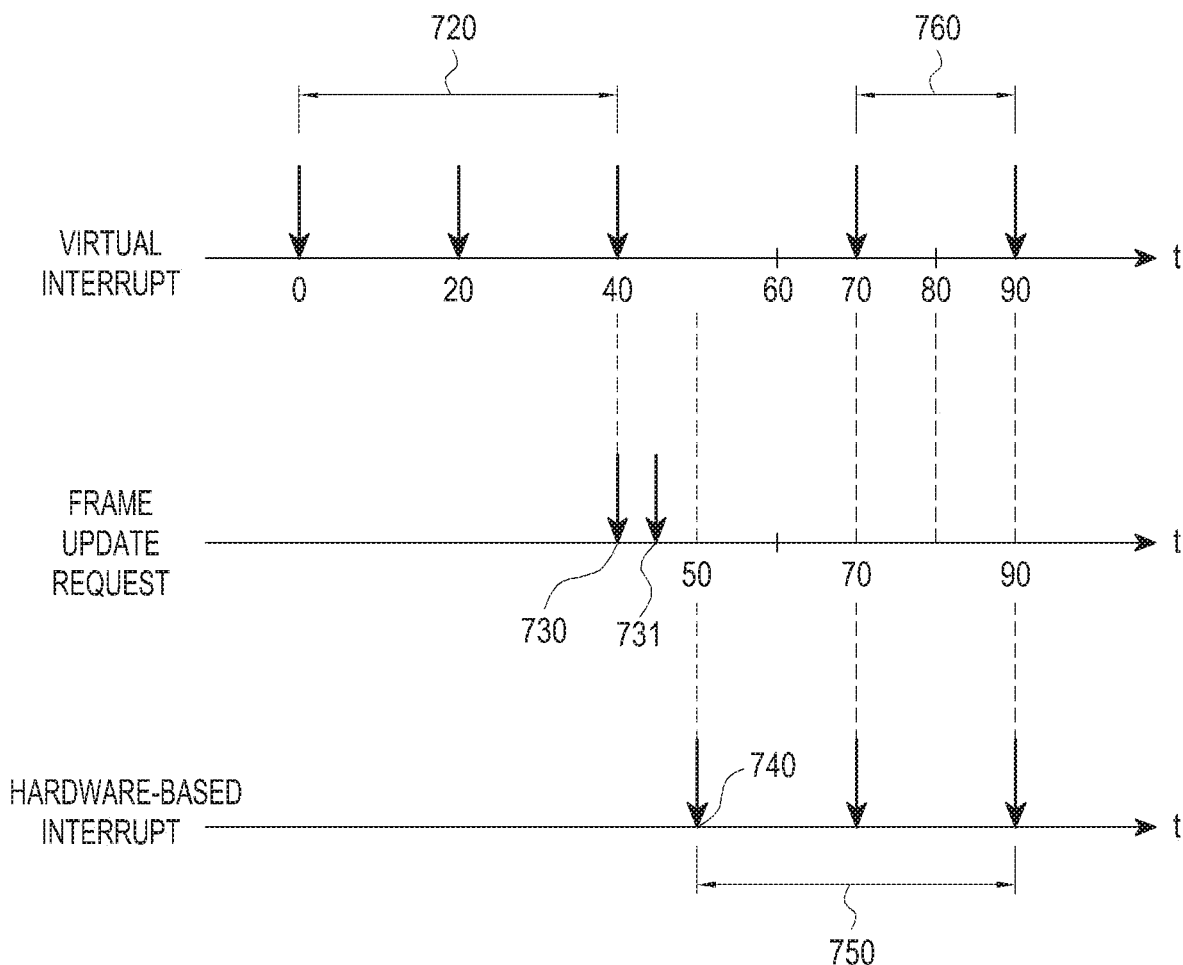
FIG. 7C is a diagram of a configuration where an electronic device synchronizes an interval of a virtual interrupt to an interval of a frame update according to various embodiments of the disclosure.

FIG. 7B is a flowchart illustrating a method for controlling an electronic device according to various embodiments of the disclosure.

Referring to FIG. 7B, in operation 711, the processor (e.g., the processor 120 of FIG. 1) receives a frame update request. In operation 712, the processor 120 activates the DDI (e.g., the DDI 230 of FIG. 2). According to various embodiments of the disclosure, the processor receives the frame update request for displaying the frame on the display (e.g., the display device 160). The processor 120 receives the frame update request generated in the application (e.g., the application 510 of FIG. 5A) through the display manager (e.g., the display manager 521 of FIG. 5A) and the device driver (e.g., the device driver 531 of FIG. 5A) and activates the DDI 230 (e.g., the DDI 542 of FIG. 5A).

In operation 713, the processor 120 receives the hardware-based interrupt from the DDI 230. Once the DDI 230 is activated, the DDI 230 activates the hardware-based interrupt 750 and transmits the hardware-based interrupt 750 to the processor 120.

In operation 714, the processor 120 determines whether the virtual interrupt is activated. The processor 120 may determine whether the virtual interrupt is activated to determine whether to synchronize the interval of the virtual interrupt with the interval of the hardware-based interrupt. When the virtual interrupt is not activated, it may not be necessary to synchronize the interval of the virtual interrupt with the interval of the hardware-based interrupt. The processor 120 may determine whether to change the interval of the software-based interrupt by checking the interval of the hardware-based interrupt and the interval of the virtual interrupt. For example, referring to FIG. 7C, in a normal case where the hardware-based interrupt does not occur, a next interrupt of the first virtual interrupt 720 may occur at 60 ms. The processor 120 determines to change the interval of the first virtual interrupt 720 for synchronization with the hardware-based interrupt, if the hardware-based interrupt occurs at 50 ms.

In operation 715, if the virtual interrupt is activated, the processor 120 synchronizes the interval of the virtual interrupt to the interval of the hardware-based interrupt. If determining to change the interval of the virtual interrupt, the processor 120 synchronizes the point to activate the next interval of the first virtual interrupt 720 with the interval of the hardware-based interrupt to set to 70 ms. The activation point and interval of the first virtual interrupt 720 may be synchronized to the activation point (e.g., 70 ms) and the interval (20 ms) of the hardware-based interrupt 750. According to an embodiment, when the change of the interval of the virtual interrupt is not needed in spite of activation of the virtual interrupt, operation 715 may be skipped.

In operation 716, the electronic device (e.g., the electronic device 101 of FIG. 1) deactivates the DDI (e.g., the DDI 230 of FIG. 2). When the frame is displayed by the DDI 230, the DDI 230 may be deactivated and may not transmit the hardware-based interrupt to the processor 120.

If the virtual interrupt is not activated in operation 714, the processor 120 deactivates the DDI in operation 716.

Figure 8:
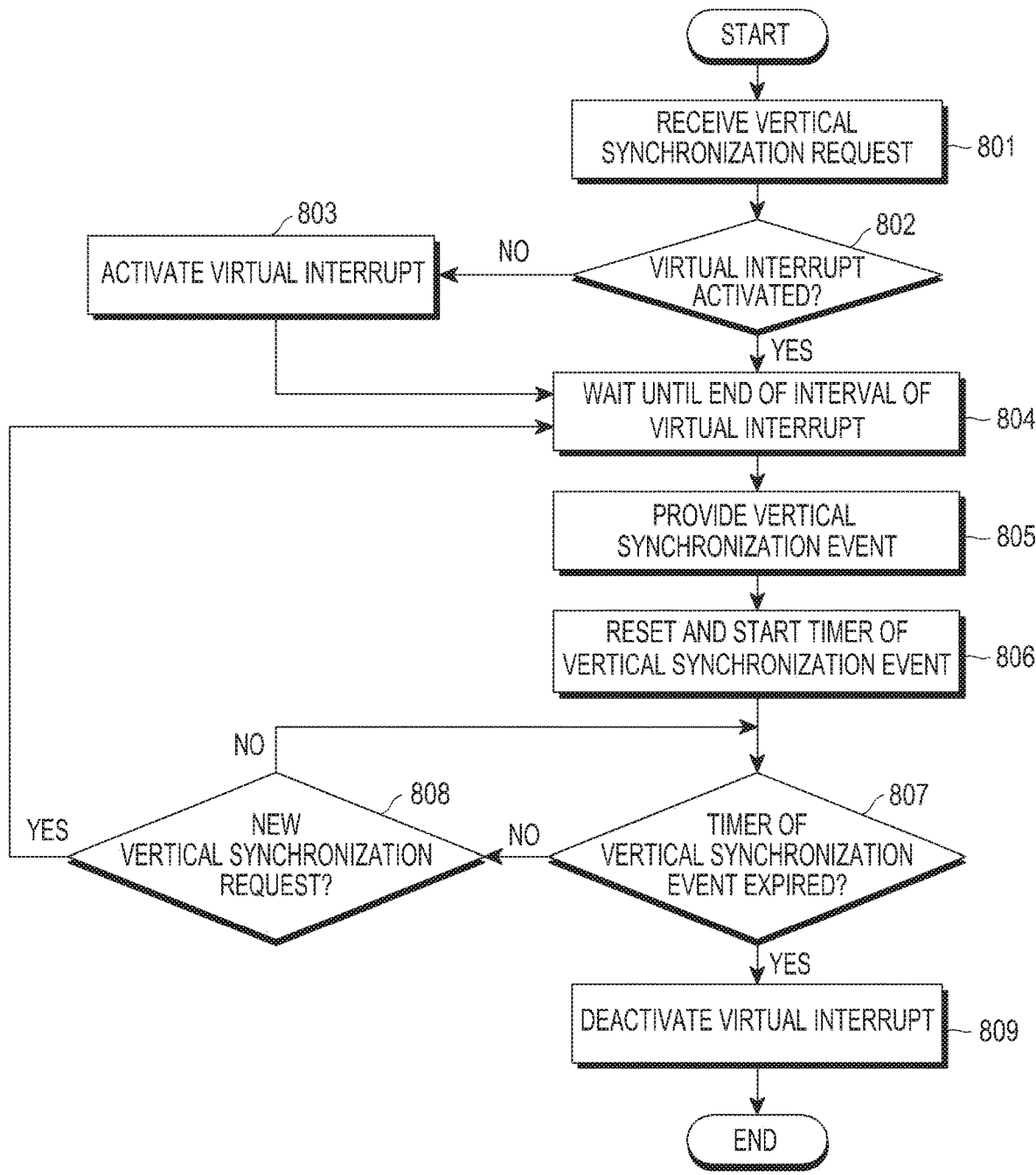
FIG. 8 is a flowchart illustrating a method for controlling an electronic device according to various embodiments of the disclosure.

FIG. 8 is a flowchart illustrating a method for controlling an electronic device according to various embodiments of the disclosure.

Referring to FIG. 8, in operation 801, the processor (e.g., the processor 120 of FIG. 1) receives a vsync request.

The processor 120 (or the processor 541 of FIG. 5A) receives a vsync request displayed on the display (e.g., the display device 160 of FIG. 1). For example, as described above with reference to FIGS. 5A and 5B, the processor 120 receives the vsync request generated in at least one of applications (e.g., the application 510 of FIG. 5A) from the device driver (e.g., the device driver 531 of FIG. 5A).

In operation 802, the processor 120 determines whether the virtual interrupt is activated. To transmit the virtual interrupt to the application 510, the processor 120 determines whether the virtual interrupt is activated. In operation 803, when the virtual interrupt is not activated, the processor activates the virtual interrupt. When the virtual interrupt is not activated, the processor 120 may activate a virtual interrupt having a particular interval. The virtual interrupt may be a software-based interrupt generated by the processor 120. For example, the interval for the virtual interrupt may be the same as the interval for the hardware-based interrupt. The interval for the virtual interrupt and the interval for the hardware-based interrupt may be the same, but may not be synchronized with each other. Referring to FIG. 7C, the first virtual interrupt 720 having a designated interval (e.g., 20 ms) may be activated in advance or may be activated by the processor 120.

In operation 804, the processor 120 waits until the end of the interval of the virtual interrupt. The first virtual interrupt 720 is repeatedly generated at intervals of, for example, 20 ms, and the processor 120, if receiving the vsync request, waits until the end of the interval every interval of 20 ms after the activation of the virtual interrupt.

In operation 805, the processor 120 provides a vsync event. If the virtual interrupt is activated in operation 802 or 803, the processor 120 may transmit the virtual interrupt to the device driver (not shown, the device driver 531 of FIG. 5A) to provide the vsync event. The processor transmits the virtual interrupt to the application (e.g., the application 510 of FIG. 5A) through the device driver (e.g., the device driver 531 of FIG. 5A) and the display manager (e.g., the display manager 521 of FIG. 5A), as described above with reference to FIGS. 5A and 5B. The processor transmits the vsync event to the application by transmitting the virtual interrupt to the application through the device driver and the display manager. Operations 801 to 805 may be performed repeatedly by the processor.

In operation 806, the processor 120 resets and drives a vsync event timer. In operation 807, the processor 120 determines whether the vsync event timer has expired. Upon activation of the vsync request, the processor 120 resets the event timer and drives the vsync event timer to measure a time until the next vsync request is received. The vsync event timer is set to operate during a preset time and stop driving the timer when the preset time expires. The processor 120 determines whether the vsync request is received until the time set by the timer expires.

In operation 808, if the vsync event timer has not expired, the processor determines whether a new vsync request is received. Upon receiving the new vsync request, the processor 120 goes to operation 804 to wait until the end of the interval of the virtual interrupt. Unless receiving the new vsync request, the processor 120 returns to operation 807 to determine whether the vsync event timer has expired. If the new vsync request is not received, the processor 120 does not need to continuously activate the virtual interrupt, and thus determines whether the vsync event timer has expired in order to determine whether to continuously activate the virtual interrupt.

In operation 809, if the vsync event timer has expired, the processor 120 deactivates the virtual interrupt until the next vsync request is received. If the new vsync request is not received, the processor 120 does not need to continuously activate the virtual interrupt, and thus determines whether the vsync event timer has expired in order to determine whether to continuously activate the virtual interrupt. The processor 120 deactivates the virtual interrupt if the vsync event timer has expired.

An electronic device (e.g., the electronic device 101 of FIG. 1), according to various embodiments of the disclosure, includes a display (e.g., the display device 160 of FIG. 1), a DDI (e.g., the DDI 230 of FIG. 2), which includes a clock generator (e.g., the clock generator 482 of FIG. 4) that is operatively connected to the display and is configured to generate a hardware-based interrupt by using the clock generator, at least one processor (e.g., the processor 120 of FIG. 1) operatively connected to the DDI 230, and a memory (e.g., the memory 130 of FIG. 1) operatively connected to the at least one processor, in which the memory 130 stores one or more instructions that, when executed, cause the at least one processor to receive a vsync request associated with a frame displayed on the display, identify whether a software-based interrupt generated by an operation of the at least one processor is activated, and when determining that the software-based interrupt is not activated, prompt the DDI to activate the software-based interrupt without generating the hardware-based interrupt.

According to an embodiment, the one or more instructions may cause the at least one processor to determine whether an interval of the software-based interrupt ends during activation of the software-based interrupt and provide a vsync event when the interval of the software-based interrupt ends. According to an embodiment, the one or more instructions may cause the at least one processor to receive a request for changing the interval for an interrupt and to change the interval for the software-based interrupt by using the hardware-based interrupt.

According to an embodiment, the one or more instructions may cause the at least one processor to synchronize an interval for the software-based interrupt to the interval for the hardware-based interrupt. According to an embodiment, the one or more instructions may cause the at least one processor to receive a frame update request associated with a frame displayed on the display, transmit the received frame update request to the DDI, and receive the hardware-based interrupt generated by the DDI. According to an embodiment, the one or more instructions may cause the at least one processor to identify whether displaying the frame is completed by the DDI in response to the frame update request and deactivate the DDI when the displaying the frame is completed. According to an embodiment, the one or more instructions may cause the at least one processor to monitor whether there is a vsync request during a selected period after providing the vsync event and deactivate the software-based interrupt when there is no vsync request during the selected period. The electronic device 101, according to an embodiment, may further include a timer configured to operate during the selected period after the vsync event has been provided.

An electronic device (e.g., the electronic device 101 of FIG. 1), according to various embodiments of the disclosure, includes a display (e.g., the display device 160 of FIG. 1), a DDI (e.g., the DDI 230 of FIG. 2), which includes a clock generator (e.g., the clock generator 482 of FIG. 4) that is operatively connected to the display and is configured to generate a hardware-based interrupt by using the clock generator, at least one processor (e.g., the processor 120 of FIG. 1) operatively connected to the DDI 230, and a memory (e.g., the memory 130 of FIG. 1) operatively connected to the at least one processor, in which the memory 130 stores one or more instructions that, when executed, cause the at least one processor to receive a frame update request associated with a frame displayed on the display, activate the DDI to generate the hardware-based interrupt, receive the hardware-based interrupt from the DDI, identify whether a software-based interrupt generated by an operation of the at least one processor is activated, and cause the DDI to activate the software-based interrupt while deactivating the DDI such that the DDI does not generate the hardware-based interrupt, when identifying that the software-based interrupt is not activated.

According to an embodiment, the one or more instructions may cause the at least one processor to change the software-based interrupt at least partially based on the hardware-based interrupt when identifying that the software-based interrupt is activated and deactivate the DDI to avoid generating the hardware-based interrupt.

According to an embodiment, the one or more instructions may cause the at least one processor to identify whether displaying the frame is completed by the DDI, in response to the frame update request, and deactivate the DDI when displaying the frame is completed. According to an embodiment, the one or more instructions may cause the at least one processor to synchronize an interval for an interrupt to the interval for the hardware-based interrupt.

A method for controlling an electronic device (e.g., the electronic device 101 of FIG. 1), according to various embodiments of the disclosure, includes receiving a vsync request associated with a frame displayed on the display, identifying whether a software-based interrupt is activated, and activating the software-based interrupt without generating, by a DDI, the hardware-based interrupt when identifying that the software-based interrupt is not activated.

According to an embodiment, the method may further include identifying whether an interval of the software-based interrupt ends during activation of the software-based interrupt and providing a vsync event when the interval of the software-based interrupt ends. According to an embodiment, the method may further include receiving a request for changing an interval for an interrupt and changing an interval for the software-based interrupt by using the hardware-based interrupt.

According to an embodiment, the method may further include synchronizing the interval for the software-based interrupt to the interval for the hardware-based interrupt. According to an embodiment, the method may further include receiving a frame update request associated with a frame displayed on the display, transmitting the received frame update request to the DDI, and receiving the hardware-based interrupt generated by the DDI.

According to an embodiment, the method may further include identifying whether displaying the frame has been completed by the DDI in response to the frame update request and deactivating the DDI when displaying the frame is completed. According to an embodiment, the method may further include monitoring whether there is a vsync request during a selected period after providing the vsync event and deactivating the software-based interrupt when there is no vsync request during the selected period. According to an embodiment, the method may further include operating, by a timer, during the selected time from a point when receiving the vsync request.

A method for controlling an electronic device, according to various embodiments of the disclosure, includes receiving a frame update request associated with a frame displayed on a display, activating a DDI to generate the hardware-based interrupt, receiving the hardware-based interrupt from the DDI, identifying whether a software-based interrupt generated by an operation of the processor is activated, and causing the DDI to activate the software-based interrupt while deactivating the DDI such that the DDI does not generate the hardware-based interrupt, when identifying that the software-based interrupt is not activated.

According to an embodiment, the method may further include changing the software-based interrupt at least partially based on the hardware-based interrupt, when identifying that the software-based interrupt is activated, and deactivating the DDI to avoid generating the hardware-based interrupt. According to an embodiment, the method may further include identifying whether displaying the frame has been completed by the DDI in response to the frame update request and deactivating the DDI when the displaying of the frame is completed. According to an embodiment, the method may further include synchronizing the software-based interval for the software-based interrupt to the interval for the hardware-based interrupt.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

According to various embodiments of the disclosure, the electronic device activates the DDI by using a hardware-based interrupt, and performs a virtual interrupt-based operation through vsync without activating the DDI, such that power consumption may be reduced because the DDI is not performed by vsync.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). When it is described that an element (such as a first element) is "operatively or communicatively coupled with/to" or "connected" to another element (such as a second element), the element can be directly connected to the other element or can be connected to the other element through another element (e.g., a third element).

As used herein, the term "module" may include a unit implemented in hardware, software, or firmware, and may interchangeably be used with other terms, for example, logic, logic block, part, or circuitry. The module may be a single integral component, or a minimum unit or part thereof, adapted to perform one or more functions. The module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). The machine may invoke stored instructions from the storage medium and operate according to the invoked instructions, and may include an electronic device (e.g., the electronic device 101) according to the disclosed embodiments. When the instructions are executed by a processor (for example, the processor 120), the processor may perform functions corresponding to the instructions. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and one or more of the above-described components may be omitted, or one or more other components may be added. Alternatively or additionally, a plurality of components (e.g., modules or programs) may be integrated into a single component, and the integrated component may still perform one or more functions of each of the plurality of components in the same or similar manner as they are performed by a corresponding one of the plurality of components before the integration. Operations performed by the module, the program, or another component according to various embodiments may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a display;
a display driver integrated circuit (DDI) operatively connected to the display, the DDI being configured to generate a hardware-based interrupt;
at least one processor operatively connected to the DDI; and
a memory operatively connected to the at least one processor,
wherein the memory stores one or more instructions that, when executed, cause the at least one processor to:
receive a first vertical synchronization (vsync) request, which is associated with a frame displayed on the display, from an application, and
in response to the DDI not being activated and to receiving the first vsync request, activate a software-based interrupt, and
wherein the application is stored in the memory and is executed at the at least one processor.

2. The electronic device of claim 1, wherein the one or more instructions further cause the at least one processor to:
output a vsync event at an end of each interval of the software-based interrupt.

3. The electronic device of claim 2, wherein the one or more instructions further cause the at least one processor to:
receive a request for changing an interval of the software-based interrupt, and
change the interval of the software-based interrupt based on the hardware-based interrupt.

4. The electronic device of claim 3, wherein the one or more instructions further cause the at least one processor to:
synchronize the interval for the software-based interrupt based on an interval for the hardware-based interrupt.

5. The electronic device of claim 2, wherein the one or more instructions further cause the at least one processor to:
monitor whether a second vsync request is received during a selected period after providing the vsync event, and
when the second vsync request is not received during the selected period, deactivate the software-based interrupt.

6. The electronic device of claim 5, further comprising:
a timer configured to operate during the selected period after the providing of the vsync event.

7. The electronic device of claim 1, wherein the one or more instructions further cause the at least one processor to:
receive a frame update request associated with the frame displayed on the display, transmit the frame update request to the DDI, and
in response to the DDI being turned on based on the frame update request being received by the DDI, receive the hardware-based interrupt from the DDI.

8. The electronic device of claim 7, wherein the one or more instructions further cause the at least one processor to:
in response to the frame update request, identify whether displaying of the frame is completed by the DDI, and
when the displaying of the frame is identified as completed, deactivate the DDI.

9. The electronic device of claim 1, wherein the one or more instructions further cause the at least one processor to:
identify a previous time that the hardware-based interrupt was generated by the DDI, and initialize the software-based interrupt to correspond to a time that another hardware-based interrupt will be output by the DDI.

10. The electronic device of claim 1, wherein the one or more instructions further cause the at least one processor to:
after the DDI is turned on based on a frame update request, determine a delay based on the software-based interrupt, and
output the frame update request to the DDI after the delay.

11. The electronic device of claim 1, wherein the one or more instructions further cause the at least one processor to:
in response to receiving the first vsync request from the application, determine, using the at least one processor, whether the DDI is activated or not activated.

12. The electronic device of claim 11, wherein the software-based interrupt is generated by the at least one processor.

13. An electronic device comprising:
a display;
a display driver integrated circuit (DDI) operatively connected to the display, the DDI being configured to generate a hardware-based interrupt;
at least one processor operatively connected to the DDI; and
a memory operatively connected to the at least one processor,
wherein the memory stores one or more instructions that, when executed, cause the at least one processor to:
receive a frame update request associated with a frame displayed on the display,
activate the DDI to generate the hardware-based interrupt,
receive the hardware-based interrupt from the DDI,
identify whether a software-based interrupt is activated, and
when the software-based interrupt is activated, determine whether to change an interval of the software-based interrupt based on an interval of the hardware-based interrupt.

14. The electronic device of claim 13, wherein the one or more instructions further cause the at least one processor to:
when the interval of the software-based interrupt is not changed, deactivate the DDI to avoid generating the hardware-based interrupt.

15. The electronic device of claim 13, wherein the one or more instructions further cause the at least one processor to:
in response to the frame update request, identify whether displaying of the frame is completed by the DDI, and
when the displaying of the frame is identified as completed, deactivate the DDI.

16. The electronic device of claim 13, wherein the one or more instructions further cause the at least one processor to increase the interval of the software-based interrupt to synchronize the interval of the software-based interrupt with the interval of the hardware-based interrupt.

17. A method for controlling an electronic device, the method comprising:
receiving, using at least one processor, a first vertical synchronization (vsync) request which is associated with a frame displayed on a display, from an application; and
in response to the receiving of the first vsync request and determining that a display driver integrated circuit (DDI) is not activated, activate, using the at least one processor, a software-based interrupt,
wherein the at least one processor is operatively connected to the DDI,
wherein the DDI is configured to generate a hardware-based interrupt, and
wherein the application is executed in the at least one processor.

18. The method of claim 17, further comprising:
outputting a vsync event at an end of each interval of the software-based interrupt.

19. The method of claim 18, further comprising:
receiving a request for changing an interval of the software-based interrupt; and
changing the interval for the software-based interrupt based on an interval of the hardware-based interrupt.

20. The method of claim 18, further comprising:
monitoring whether there is a second vsync request during a selected period after providing the vsync event; and
when the second vsync request is not received during the selected period, deactivating the software-based interrupt.

21. The method of claim 20, further comprising operating a timer during the selected period from a point when receiving the second vsync request.

22. The method of claim 17, further comprising:
synchronizing an interval of the software-based interrupt abased on an interval of the hardware-based interrupt.

23. The method of claim 17, further comprising:
receiving a frame update request associated with the frame displayed on the display;
transmitting the frame update request to the DDI; and
receiving the hardware-based interrupt from the DDI.

24. The method of claim 23, further comprising:
in response to the frame update request, identifying whether displaying of the frame is completed by the DDI; and
when the displaying of the frame is completed, deactivating the DDI.

* * * * *